US006439368B1

(12) United States Patent
Körtge

(10) Patent No.: US 6,439,368 B1
(45) Date of Patent: Aug. 27, 2002

(54) LABELING SYSTEM FOR CONTAINER

(75) Inventor: Lutz Körtge, Hamburg (DE)

(73) Assignee: KHS Maschinen-und Anlagenbau AG, Dortmund (DE)

( * ) Notice: Subject to any disclaimer, the term of this patent is extended or adjusted under 35 U.S.C. 154(b) by 0 days.

(21) Appl. No.: 09/569,407

(22) Filed: May 12, 2000

(30) Foreign Application Priority Data

May 14, 1999 (DE) .................................... 299 08 827 U

(51) Int. Cl.[7] ................................................ B65G 17/32
(52) U.S. Cl. .................................. 198/377.06; 156/567
(58) Field of Search ....................... 198/377.01, 377.06, 198/377.07, 459.1, 459.2, 474.1, 469.1; 156/567, 571, 556, 450, 568, 451

(56) References Cited

U.S. PATENT DOCUMENTS 5,121,827 A * 6/1992 Ribordy ...................... 198/377

FOREIGN PATENT DOCUMENTS

| | | |
|---|---|---|
| DE | 3307662 | 9/1984 |
| EP | 0547427 | 6/1993 |

* cited by examiner

*Primary Examiner*—Kenneth W. Noland
(74) *Attorney, Agent, or Firm*—Nils H. Ljungman & Associates

(57) ABSTRACT

A carousel which rests on a fixed base and is driven by a centrally located drive shaft, which carousel has a number of turntables located on its periphery. Each turntable is adapted to support a container. A radial cam is comprised of a number of cam segments which are detachably attached to a cam carrier which is attached to the fixed base. A cam follower is attached to each turntable to engage the cam during rotation of the carousel in order to control the movement of the turntable. When the turntable is not in operation, the cam carrier can be rotated with respect to the fixed base to facilitate the removal and replacement of cam segments.

19 Claims, 3 Drawing Sheets

LABELING SYSTEM FOR CONTAINER

BACKGROUND OF THE INVENTION

1. Field of the Invention

The present invention may relate to a labeling system for labeling containers and controlling the rotational movement of containers or vessels such as bottles and cans on a transport carousel.

2. Background Information

Such devices are used in particular in connection with labeling machines for containers, for example, bottles and cans. During the mechanical labeling process, the containers to be labeled may be transported by means of a conveyor device to the transport carousel of a labeling machine. In the peripheral area of the transport carousel, there may be rotationally mounted turntables, on each of which, by means of a descending centering device (also called a "bell"), a container may be fixed in position on the turntable. Around the transport carousel there may be one or more stationary labeling stations. There may also be a brushing station on the transport carousel, which brushing station may be used, for example, for spacing or affecting or regulating the movement of the containers or facilitating their movement. For the actual labeling process, the containers on the rotating transport carousel may be transported past the labeling station or stations, as the containers are simultaneously rotated by means of the turntable relative to the transport carousel in a defined sequence of rotational steps, to deliver and move the containers past the respective labeling stations and to apply the labels at a defined angular orientation and at a defined speed of rotation and angular velocity.

To control the rotation of the individual turntables relative to the transport carousel, attached to each turntable may be a cam follower guide device which, during the rotation of the transport carousel, may roll along a radial cam or control cam that may be essentially non-rotational with respect to the transport carousel and follows the pattern of this cam during the rotation of the transport carousel. On this stationary radial cam, the desired sequence of rotational movements may be specified by the shape of the radial cam. As a result of the rolling of the guide device, which has, for example, a cross-shaped arrangement of rollers attached non-rotationally to the bottom of the turntable, along the radial cam, the desired rotational movement may be transmitted by the guide device from the radial cam to the turntable.

The radial cam can be realized so that it is outboard with respect to the cross-shaped arrangement of rollers, so that the cross-shaped arrangement of rollers follows the shape of the inside surface of the radial cam.

A similar device of the known art is described in German Patent No. 33 07 662 C2, hereby incorporated by reference herein, for example, which relates to a labeling machine with an outboard radial cam.

The known art also includes a labeling machine designated "Contiroll" and manufactured by Krones AG, in which the outboard radial cam is divided into stationary segments, and one segment can be replaced or exchanged to vary the shape of the radial cam and thus the specified rotational movement of the turntable and to adapt it to the shape and size of the containers currently being processed in the vicinity of the labeling station.

Because during the operation of a labeling machine, different labeling stations are distributed over the periphery of the path of rotation of the turntables around the transport carousel to perform the different process steps, such as picking up the label, applying the glue, positioning the label on the container, pressing the label onto the container, etc. access to the transport carousel and the radial cam underneath it, or in any case access to the areas where labeling stations are located in proximity to the transport carousel, is either very difficult or essentially altogether impossible, it can be extremely difficult or altogether impossible to detach or remove segments of the radial cam. To replace the entire radial cam by replacing all the segments, it is therefore necessary to remove all of the labeling stations, so that the radial cam becomes accessible over its entire periphery. Such a removal process is labor-intensive, time-consuming and difficult and requires the machine to be shut down for a long time, if all or even some of the segments of the radial cam are to be replaced.

European Patent No. 0 547 427 B1, hereby incorporated by reference herein, describes a device to control the rotational movement of turntables, in which the outboard radial cam can be adjusted in the direction of rotation, to thereby make it possible to bring different radial cam shapes into the active area and into contact with the guide devices rolling past them, thereby making it possible to adapt the machine to different sizes of containers. On this device, therefore, the desired portion of the radial cam is brought into the active area as a result of the rotation. On the other hand, there are no replaceable radial cam segments, because the desired variability of the active radial cam shape is determined by the rotational setting of the radial cam.

OBJECT OF THE INVENTION

One possible object of the present invention may be to create a device to control the rotational movement of containers in which essentially any desired radial cam can be essentially quickly and easily installed and removed, in particular essentially without a requirement for any tools.

SUMMARY OF THE INVENTION

At least one possible embodiment of the present invention preferably teaches that the radial cam segments may be detachably held on a cam carrier, whereby the cam carrier can rotate with respect to the stationary frame around the axis of rotation of the transport carousel. There may also be an immobilization device, by means of which the radial cam carrier can be detachably fastened in place to essentially prevent rotations with regard to the axis of rotation of the transport carousel.

In other words, in at least one possible embodiment of the present invention, the cam carrier may rotate either clockwise or counterclockwise.

On the basis of this possible configuration of the present invention, to replace a radial cam, the cam carrier can be released from its immobilized position and thus rotated, so that the radial cam segment to be replaced may come to lie in an easily accessible position. Following the replacement of the radial cam segment, the cam carrier can be rotated farther, and an additional radial cam segment can be replaced if necessary. After the replacement of all the desired radial cam segments, the cam carrier may be rotated back into its starting position and may be secured by means of the immobilization device to essentially prevent rotation, so that the radial cam can be essentially guaranteed to remain stationary. In this manner, the radial cam can be modified or completely replaced if necessary without having to dismantle and remove other devices that are located around the transport carousel. This capability may significantly reduce the amount of time and labor required to replace a radial cam.

The above-discussed embodiments of the present invention will be described further hereinbelow with reference to the accompanying figures. When the word "invention" is used in this specification, the word "invention" includes "inventions", that is, the plural of "invention". By stating "invention", Applicant does not in any way admit that the present application does not include more than one patentably and non-obviously distinct invention, and maintains that this application may include more than one patentably and non-obviously distinct invention. Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to one exemplary embodiment which is illustrated in the accompanying drawings.

FIG. 1 is a cross section elevation view of the labeling machine of FIG. 2; and FIG. 2 is a plan view of a labeling marking incorporating at least one embodiment of the present invention.

FIG. 3 is a duplicate of FIG. 1 with additional information.

DESCRIPTION OF THE PREFERRED EMBODIMENT

Figure 1:
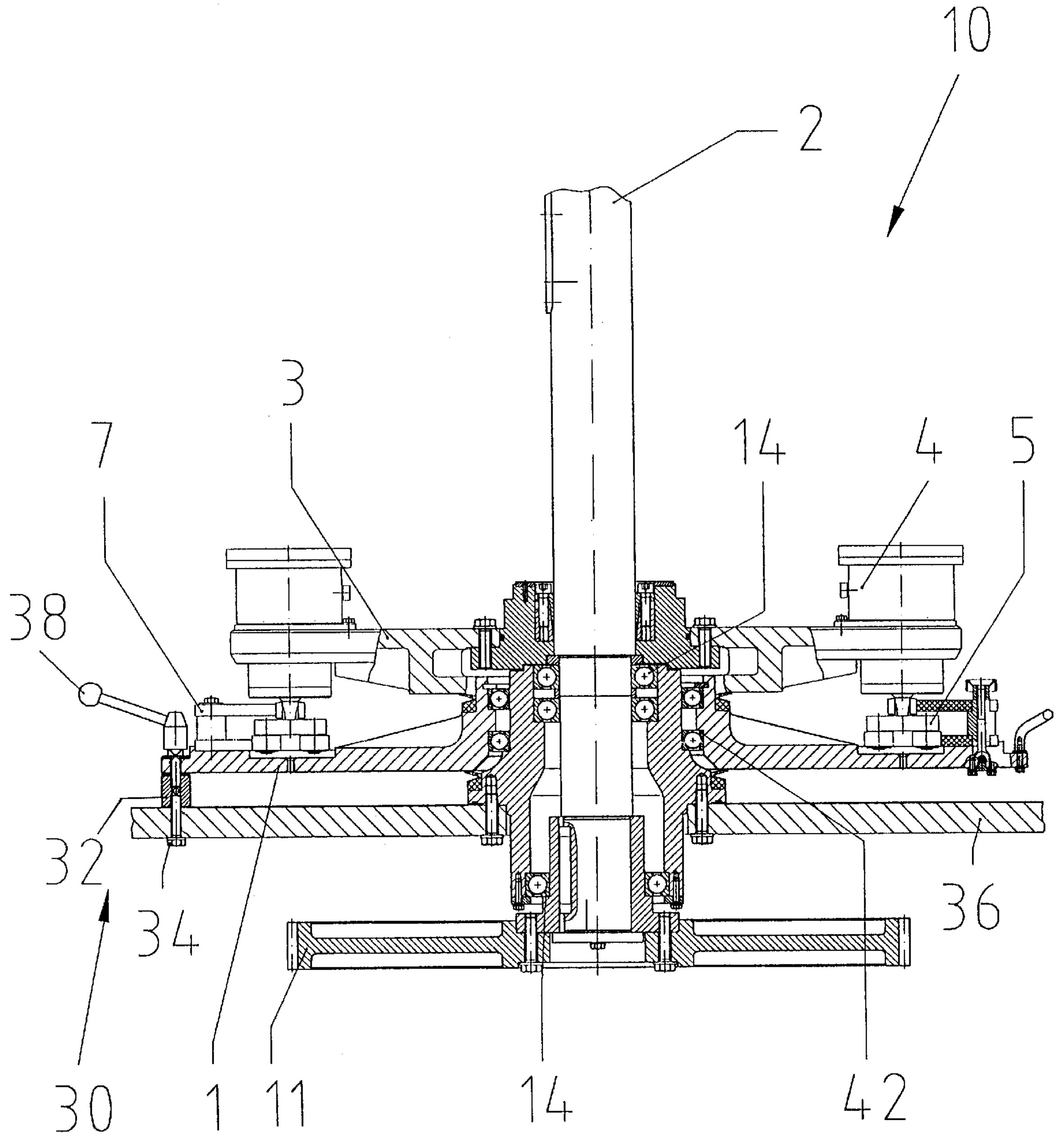
FIGS. 1–3 show a cross section of the relevant portion of a labeling machine.
Figure 2:
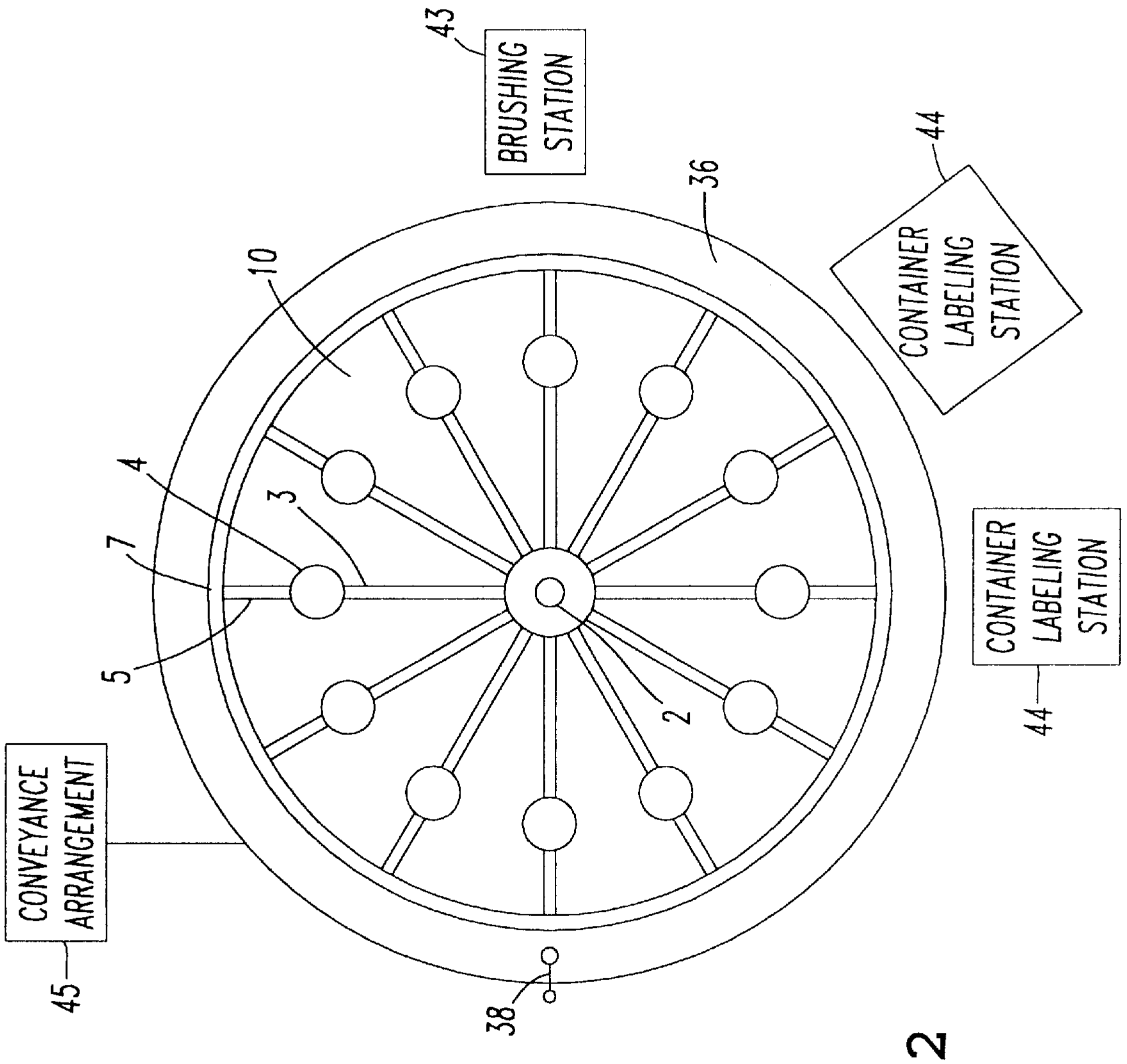

According to FIGS. 1 and 2, the labeling system or labeling machine 10 has a base plate 36 which is part of a stationary frame (not shown). In the base plate 36, a vertical drive shaft 2 is rotationally mounted by means of a plurality of ball bearings 14 (shown in FIG. 1). Attached to the lower portion of the drive shaft 2 is a drive gear wheel 11 (also shown in FIG. 1). The drive gear wheel 11 is driven in rotation by drive devices that are not shown.

FIG. 2 shows, for example, a brushing station 43 that may be used for spacing containers, for facilitating spacing containers on at least one conveyance arrangement 45 or on turntables 4, or for otherwise regulating or facilitaing movement of containers to, in, through, within, and/or out of the labeling system.

Figure 3:
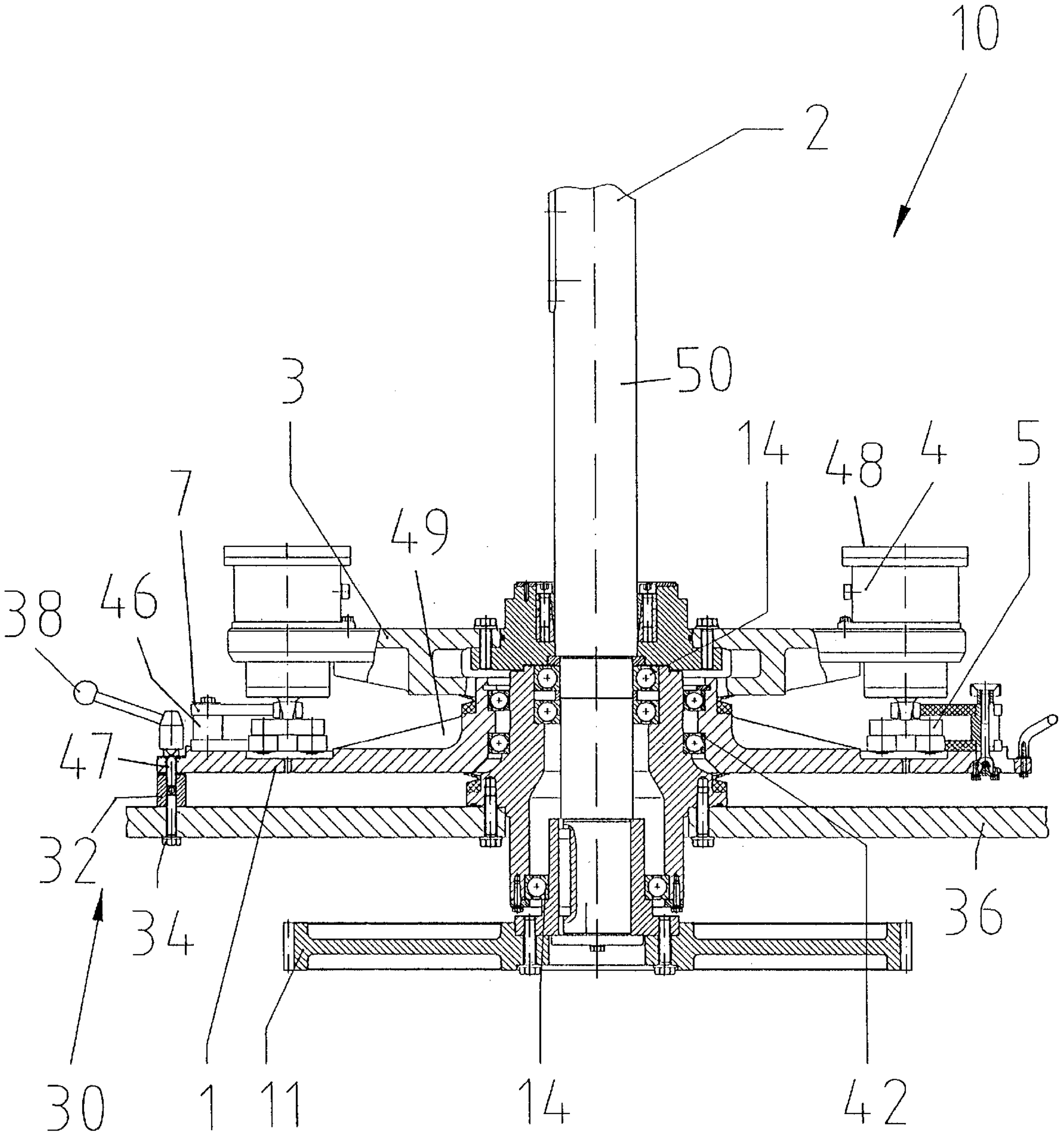

FIG. 3 is a duplicate of FIG. 1 with additional information. For example, according to FIG. 3, the cam carrier 1 may have a first hub 49, a second hub 49, or a first and second hub 49.

Firmly connected to the drive shaft 2 is a transport carousel 3. The transport carousel 3 has a plurality of turntables 4 that are located concentric to the axis of rotation 50 of the drive shaft 2 and are distributed around the periphery of the transport carousel 3. Each turntable 4 is connected with a cam follower guide device 5, which is realized so that it rolls along a radial cam 7 located outside the rotational path of the turntable 4. In the illustrated embodiment, the guide device 5 has a cross-shaped arrangement of rollers 46 that are connected with the axis of rotation of the turntable. The cross-shaped arrangement of rollers 46 is an arrangement of four rollers 46, the vertical axes of rotation of which lie at the corners of a square. However, other shapes of roller arrangements 46 are also possible as guide devices 5 that are in contact with the radial cam 7. The shape of the radial cam 7 determines the relative rotation of the guide device 5 with respect to the purely radial direction with regard to the axis of rotation of the drive shaft 2 and thus determines the relative rotation of the turntable 4 with regard to the transport carousel 3 as it rotates.

The radial cam 7, in at least one possible embodiment of the present invention, is essentially easy to change or replace so that it may become possible to execute different rotation programs, i.e., to effect different desired rotational movements during the circulation of a container on a turntable on the transport carousel. This change or replacement is facilitated by the fact that along the periphery of the radial cam 7, the radial cam 7 consists of a plurality of segments that can be detached from the cam carrier 1. For example, the segments of the radial cam 7 can be fastened to the cam carrier 1 by means of screws that are accessible from above. The cam carrier 1, in at least one possible embodiment of the present invention, is also mounted so that it can rotate with respect to the axis of rotation of the drive shaft 2, and namely in the illustrated exemplary embodiment by means of ball bearings 42, which are located on the outside of the bearing shell of the bearing of the drive shaft 2. By means of this rotatable mounting, it may be possible to bring the cam carrier 1 and thus the respective segment of the radial cam 7 to be replaced into essentially the most accessible position possible on the labeling machine, so that the segment in question of the radial cam 7 can be replaced essentially easily. Following the replacement of the segment, the cam carrier 1 can be rotated farther to continue the replacement of additional segments. After the replacement process has been completed, the cam carrier 1 is again essentially fixed in position relative to the base plate 36, so that the radial cam 7 is again held non-rotationally and thus in turn forms a stationary radial cam along which the guide devices 5 can roll.

In the illustrated exemplary embodiment, the immobilization device to fix the cam carrier 1 in position to prevent rotation is formed by a slot 47 that runs in the cam carrier 1 and a threaded peg or piece 32 that is fastened in the base plate 36. The slot 47 in the cam carrier 1 is concentric to the axis of rotation of the drive shaft 2 and extends over an angular range such that the desired rotations of the cam carrier 1 with respect to the base plate 36 can be executed. Generally, a rotation capability of less than 180 degrees is sufficient. The threaded piece 32 is fastened on its lower end that projects out of the base plate 36 to the base plate 36 by means of a screw 34. To achieve a friction-tight or essentially friction-tight immobilization of the cam carrier 1 with respect to the base plate 36, the cam carrier 1 can be fixed in position by a clamping lever 38, for example, which when tightened may essentially ensure contact between the cam carrier 1 and the threaded piece 32, and thus may fix the cam carrier 1 in position in a friction-tight or essentially friction-tight manner with respect to the stationary base plate 36. The cam carrier 1 is thus clamped to the threaded piece 32.

Naturally, in connection with this invention, other types of immobilization devices can also be used for the non-rotational immobilization of the cam carrier.

One feature of the invention resides broadly in a labeling system for labeling containers comprising at least one conveyance arrangement for conveying containers to, within, and out of the labeling system; and at least one container labeling station; and a device to control the movement of containers, comprising: a fixed base; a drive shaft rotatably connected to said fixed base, the drive shaft having an axis of rotation; a carousel attached to the drive shaft, the carousel having a periphery concentric to the axis of rotation of the drive shaft; a plurality of turntables mounted on the periphery of the carousel, each turntable being adapted to support a container and each turntable having a cam follower guide attached thereto; a cam carrier disposed to engage each cam follower guide; the cam comprising a plurality of cam segments, each cam segment being detachably attached to the cam carrier; and means for detachably fixing the cam carrier to the fixed base so as to prevent rotation of the cam carrier with respect to the fixed base.

One feature of the invention resides broadly in the device to control the rotational movement of containers 10 with a transport carousel 3 that is fastened to a drive shaft 2 and can be rotated with respect to a stationary frame, in the peripheral area of which transport carousel, concentric to the axis of rotation of the drive shaft, there are a number of rotationally mounted turntables 4, a centering device 48 above each of the turntables 4, by means of which a container can be clamped between a turntable 4 and the associated centering device 48, a radial cam 7 that is non-stationary with respect to the stationary frame, and a guide device 5 on each turntable 4, which guide device is realized so that it can roll along the radial cam 7 to rotate the turntable 4 during the rotation of the transport carousel 3 with respect to the radial cam in a manner specified by the shape of the radial cam with respect to the transport carousel 3, whereby the radial cam 7 lies outside on the rotational path of the guide devices 5 and is divided into segments along the periphery, which segments can be detached from their mounting, characterized by the fact that the radial cam segments are detachably mounted on a cam carrier 1 which is mounted so that it can rotate with respect to the stationary frame around the axis of rotation of the transport carousel 3, and that there is an immobilization device 32, 34, 38 with which the cam carrier can be detachably fixed in position to prevent it from rotating around the axis of rotation of the transport carousel 3.

Another feature of the invention resides broadly in the device characterized by the fact that the device 10 has a central hub 49 that is mounted by means of ball bearings 42 on the stationary frame so that it can rotate with respect to the axis of rotation of the transport carousel 3.

Yet another device characterized by the fact that the hub of the cam carrier 1 is mounted by means of ball bearings 42 on the bearing shell of the pivot bearing of the drive shaft 2.

Still another feature of the invention resides broadly in the device characterized by the fact that the immobilization device 30 has a threaded peg 32 that runs through a boring in the base plate 36, which threaded peg is fastened to the base plate 36 and projects with its end that sticks up from the base plate 36 through a slot in the cam carrier 1, which slot is shaped so that it runs concentric to the axis of rotation of the cam carrier 1.

A further feature of the invention resides broadly in the device characterized by the fact that the threaded peg 32 that projects through the cam carrier 1 is provided on its end lying on the far side of the cam carrier 1 with a clamping lever 38 which, in the loosened position, makes it possible to rotate the cam carrier 1, and which, when it is tightened, provides the clamping required to achieve a friction-tight contact against the cam carrier 1, so that the cam carrier 1 can be clamped in position by tightening the clamping lever 38 to prevent rotations with respect to the base plate 36.

The components disclosed in the various publications, disclosed or incorporated by reference herein, may be used in the embodiments of the present invention, as well as equivalents thereof. The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following patents, patent applications, or patent publications, which may describe labeling machines and systems and components that may possibly be used or adapted for use with at least one embodiment of the present invention, are hereby incorporated by reference as if set forth in their entirety herein: Canada Patent No. 1,301,119, filed on May 24, 1988, having inventors Rudolf Zodrow, Wolfgang Rogall, Egon Hoveler, and Ranier Buchholz; U.S. Pat. No. 4,944,830, filed on May 23, 1988, having inventors Rudolf Zodrow, Wolfgang Rogall, Egon Hoveler, and Ranier Buchholz; Canada Patent No. 1,317,570, filed on Oct. 21, 1988, having inventors Wolfgang Rogall, Wilfried Rubel, Dieter Thiel, and Rudolf Zodrow; U.S. Pat. No. 4,911,285, filed on Oct. 21, 1988, having inventors Wolfgang Rogall, Wilfried Rubel, Dieter Thiel Rudolf Zodrow; Canada Patent No. 1,326,222, filed on Feb. 27, 1989, having inventors Rudolf Zodrow, and Wolfgang; U.S. Pat. No. 4,950,350, filed on Feb. 24, 1989, having inventors Rudolf Zodrow, and Wolfgang Rogall; Canada Patent No. 1,329,923, filed on Apr. 7, 1989, having inventors Rudolf Zodrow and Rainer, Buccholz; U.S. Pat. No. 5,017,261, filed on Apr. 7, 1989, having inventors Rudolf Zodrow, and Rainer Buccholz; Canada Patent No. 1,329,921, filed on Apr. 7, 1989, having inventor Rudolf Zodrow; and U.S. Pat. No. 5,062,917, filed on Apr. 7, 1989, having inventor Rudolf Zodrow; Canada Patent No. 1,338,622, filed on Apr. 7, 1989, having inventors Rudolf Zodrow, Heinz-Jurgen Rosenberg, and Egon Hoveler; U.S. Pat. No. 4,981,547, filed on Apr. 7, 1989, having inventors Rudolf Zodrow, Heinz-Jurgen Rosenberg and Egon Hoveler; Canada Patent No. 1,329,922, filed on Apr. 7, 1989, having inventor Rudolf Zodrow; U.S. Pat. No. 5,004,518, filed on Apr. 7, 1989, having inventor Rudolf Zodrow; Canada Patent Application No. 2002234-5, filed on Nov. 3, 1989, having inventor Wolfgang Rogall; U.S. Pat. No. 5,078,826, issued on Jan. 7, 1992, having inventor Wolfgang Rogall; Canada Patent Application No. 2002232-9, filed on Nov. 3, 1989, having inventor Rudolf Zodrow; U.S. Pat. No. 5,062,918, issued on Nov. 5, 1991, having inventor Rudolf Zodrow; Canada Patent Application No. 2012394, filed on Mar. 16, 1990, having inventors Rudolf Zodrow, and Rainer Buchholz; U.S. Pat. No. 5,227,005, issued on Jul. 13, 1993, having inventors Rudolf Zodrow, and Rainer Buchholz; Canada Patent Application No. 2021074-5, filed on Jul. 12, 1990, having inventor Wolfgang Rogall; U.S. Pat. No. 5,087,317, filed Oct. 5, 1990, having inventor Rudolf Josef Tomashauser; U.S. Pat. No. 5,129,984, filed on Oct. 5, 1990, having inventors Josef Tomashauser, and Rudolf Zodrow; Canada Patent Application No. 2027018-7, filed on Oct. 5, 1990, having inventors Josef Tomashauser, and Rudolf Zodrow; U.S. Pat. No. 5,185,053, filed on Oct. 10, 1990, having inventors Josef Tomashauser, and Rudolf Zodrow; Canada Patent Application No. 2038190, filed on Mar. 13, 1991, having inventors Rainer Buchholz, and Rudolf Zodrow; U.S. Pat. No. 5,217,538, filed on Mar. 13, 19991, having inventors Rainer Buchholz, and Rudolf Zodrow; Canada Patent No. 2,041,542, filed on Apr. 30, 1991, having inventors Rudolf Zodrow, Rainer Buchholz, and Wolfgang Rogall; U.S. Pat. No. 5,174,851, filed on May 1, 1991, having inventors Rudolf Zodrow, Rainer Buchholz, and Wolfgang Rogall; Canada Patent Application No. 2,039,361, filed on Mar. 28, 1991, having inventors Rainer Buchholz, and Rudolf Zodrow; U.S. Pat. No. 5,110,402, filed on Mar. 28, 1991, having inventors Rainer Buccholz, and Rudolf Zodrow; Canada Patent Application No. 2044894-6, filed on Jun. 18, 1991, having inventors Rudolf Zodrow, and Werner Nitschke; U.S. Pat. No. 5,569,353, filed on May 19, 1995, having inventor Rudolf Zodrow; U.S. Pat. No. 5,713,403, filed on Apr. 5, 1996, having inventors Ludwig Clusserath, Jean Marti, and Klaus-Werner Jung; Federal Republic of Germany Patent No. 33 07 662 C2; and European Patent No. 0 547 427 B1.

Some further examples of labeling machines, labeling systems, bottling systems, cams, and related components thereof that may possibly be used or adapted for use with at least one embodiment of the present invention may be found in the following U.S. patents, which patents are hereby incorporated as if set forth in their entirety herein: U.S. Pat. No. 6,050,319, issued to inventor Hinton on Apr. 18, 2000; U.S. Pat. No. 5,882,474, issued to inventors Gomes et al. on Mar. 16, 1999; U.S. Pat. No. 5,271,783, issued to inventor Potter on Dec. 21, 1993; U.S. Pat. No. 5,201,984, issued to inventor Bedin on Apr. 13, 1993; U.S. Pat. No. 5,188,696, issued to inventor Good, Jr. on Feb. 23, 1993; U.S. Pat. No. 5,160,570, issued to inventor Dickey on Nov. 3, 1992; U.S. Pat. No. 5,121,827, issued to inventor Ribordy on Jun. 16, 1992; U.S. Pat. No. 5,120,392, issued to inventors Butkevich et al. on Jun. 9, 1992; U.S. Pat. No. 5,082,520, issued to inventors West et al. on Jan. 21, 1992; U.S. Pat. No. 5,037,499, issued to inventors Bright et al. on Aug. 6, 1991; U.S. Pat. No. 5,021,116, issued to inventors Milgram, Jr. et al. on Jun. 4, 1991; U.S. Pat. No. 4,994,135, issued to inventor Orlandi on Feb. 19, 1991; U.S. Pat. No. 4,973,374, issued to inventor Karlyn on Nov. 27, 1990; U.S. Pat. No. 4,944,825, issued to inventors Gifford et al. on Jul. 31, 1990; U.S. Pat. No. 4,743,469, issued to inventor Lehmann on May 10, 1988; U.S. Pat. No. 4,731,147, issued to inventor Mohn on Mar. 15, 1988; U.S. Pat. No. 4,729,811, issued to inventor DiFrank on Mar. 8, 1988; and U.S. Pat. No. 4,709,800, issued to inventor Olsen on Dec. 1, 1987.

The corresponding foreign patent publication applications, namely, Federal Republic of Germany Patent Application No. G 299 08 827.8, filed on May 14, 1999, having inventor Lutz Körtge, and DE-OS G 299 08 827.8 and DE-PS G 299 08 827.8, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at Applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A labeling system for labeling beverage containers, said labeling system comprising:

at least one conveyance arrangement for conveying containers to, within, and out of said labeling system; and at least one container labeling station for labeling containers; and a device to control the movement of beverage containers, comprising:

a fixed base;

a drive shaft rotatably connected to said fixed base, said drive shaft having an axis of rotation;

a carousel attached to said drive shaft, said carousel having a periphery concentric to said axis of rotation of said drive shaft;

a plurality of turntables mounted on said periphery of said carousel, each said turntable being adapted to support a container and each said turntable having a cam follower guide attached thereto;

a cam carrier disposed to engage each said cam follower guide;

said cam comprising a plurality of cam segments, each said cam segment being detachably attached to said cam carrier; and means for detachably fixing said cam carrier to said fixed base so as to prevent rotation of said cam carrier with respect to said fixed base.

2. A device to control the movement of containers such as beverage bottles, comprising:

a fixed base;

a drive shaft rotatably connected to said fixed base, said drive shaft having an axis of rotation;

a carousel attached to said drive shaft, said carousel having a periphery concentric to said axis of rotation of said drive shaft;

a plurality of turntables mounted on said periphery of said carousel, each said turntable being adapted to support a container and each said turntable having a cam follower guide attached-thereto;

a cam carrier rotatably mounted on said fixed base such that said cam carrier is rotatable with respect to said axis of rotation of said drive shaft;

a cam disposed to engage each said cam follower guide;

said cam comprising a plurality of cam segments, each said cam segment being detachably attached to said cam carrier;

means for detachably fixing said cam carrier to said fixed base so as to prevent rotation of said cam carrier with respect to said fixed base; and said cam follower guide comprising at least one roller adapted to roll along said cam.

3. A. The device according to claim 2, wherein said at least one roller comprises a multiplicity of rollers arranged in the shape of a cross, each of said multiplicity of rollers being disposed to roll along said cam.

4. The device according to claim 3, wherein said carousel further comprises a first hub rotatably engaged to said fixed base by means of ball bearings.

5. The device according to claim 4, wherein said cam carrier is rotatably mounted on said fixed base by a second hub rotatably engaged to said fixed base by means of ball bearings.

6. The device according to claim 5, wherein:

said cam carrier is provided with a slot which defines an arc of a circle concentric to said axis of rotation of said drive shaft;

said means for detachably fixing said cam carrier to said fixed base comprises a peg attached to said fixed base; and said peg has an end which projects through said slot in said carrier.

7. The device according to claim 6, wherein said means for detachably fixing said cam carrier to said fixed base further comprises a clamping lever attached to said end of said peg, said clamping lever being adapted to achieve substantially friction-tight contact against said cam carrier.

8. The device according to claim 7, further comprising a centering device disposed above each said turntable, each said centering device being adapted to clamp a container to said turntable.

9. A device to control the rotational movement of containers with a transport carousel that is fastened to a drive shaft and can be rotated with respect to a stationary frame, in the peripheral area of which transport carousel, concentric to the axis of rotation of the drive shaft, there are a number of rotationally mounted turntables, a centering device above each of the turntables, by means of which a container can be clamped between a turntable and the associated centering device, a radial cam that is non-stationary with respect to the stationary frame, a guide device on each turntable, which guide device is realized so that it can roll along the radial cam to rotate the turntable during the rotation of the transport carousel with respect to the radial cam in a manner specified by the shape of the radial cam with respect to the transport carousel, whereby the radial cam lies outside on the rotational path of the guide devices and is divided into segments along the periphery, which segments can be detached from their mounting, wherein the radial cam segments are detachably mounted on a cam carrier which is mounted so that it can rotate with respect to the stationary frame around the axis of rotation of the transport carousel, and there is an immobilization device with which the cam carrier can be detachably fixed in position to prevent it from rotating around the axis of rotation of the transport carousel.

10. The device according to claim 9, wherein the device has a central hub that is mounted by means of ball bearings on the stationary frame so that it can rotate with respect to the axis of rotation of the transport carousel.

11. The device according to claim 10, wherein the hub of the cam carrier is mounted by means of ball bearings on the bearing shell of the pivot bearing of the drive shaft.

12. The device according to claim 11, wherein the immobilization device has a threaded peg that runs through a boring in the base plate, which threaded peg is fastened to the base plate and projects with its end that sticks up from the base plate through a slot in the cam carrier, which slot is shaped so that it runs concentric to the axis of rotation of the cam carrier.

13. The device according to claim 12, wherein the threaded peg that projects through the cam carrier is provided on its end lying on the far side of the cam carrier with a clamping lever which, in the loosened position, makes it possible to rotate the cam carrier, and which, when it is tightened, provides the clamping required to achieve a friction-tight contact against the cam carrier, so that the cam carrier can be clamped in position by tightening the clamping lever to prevent rotations with respect to the base plate.

14. The device according to claim 9, wherein the immobilization device has a threaded peg that rung through a boring in the base plate, which threaded peg is fastened to the base plate and projects with its end that sticks up from the base plate through a slot in the cam carrier, which slot is shaped so that it runs concentric to the axis of rotation of the cam carrier.

15. The device according to claim 10, wherein the immobilization device has a threaded peg that runs through a boring in the base plate, which threaded peg is fastened to the base plate and projects with its end that sticks up from the base plate through a slot in the cam carrier, which slot is shaped so that it runs concentric to the axis of rotation of the cam carrier.

16. Device to control the rotational movement of containers (10) with a transport carousel (3) that is fastened to a drive shaft (2) and can be rotated with respect to a stationary frame, in the peripheral area of which transport carousel, concentric to the axis of rotation of the drive shaft, there are a number of rotationally mounted turntables (4), a centering device above each of the turntables (4), by means of which a container can be clamped between a turntable (4) and the associated centering device, a radial cam (7) that is non-stationary with respect to the stationary frame, and a guide device,(5) on each turntable (4), which guide device is realized so that it can roll along the radial cam (7) to rotate the turntable (4) during the rotation of the transport carousel (3) with respect to the radial cam in a manner specified by the shape of the radial cam with respect to the transport carousel (3), whereby the radial cam (7) lies outside on the rotational path of the guide devices (5) and is divided into segments along the periphery, which segments can be detached from their mounting, characterized by the fact that the radial cam segments are detachably mounted on a cam carrier (1) which is mounted so that it can rotate with respect to the stationary frame around the axis of rotation of the transport carousel (3), and that there is an immobilization device (32, 34, 38) with which the cam carrier can be detachably fixed in position to prevent it from rotating around the axis of rotation of the transport carousel (3).

17. Device as claimed in claim 16, characterized by the fact that the device (10) has a central hub that is mounted by means of ball bearings (14) on the stationary frame so that it can rotate with respect to the axis of rotation of the transport carousel (3).

18. Device as claimed in claim 17, characterized by the fact that the hub of the cam carrier (1) is mounted by means of ball bearings (42) on the bearing shell of the pivot bearing of the drive shaft (2).

19. Device as claimed in claim 18, characterized by the fact that the immobilization device (30) has a threaded peg (32) that runs through a boring in the base plate (36), which threaded peg is fastened to the base plate (36) and projects with its end that sticks up from the base plate (36) through a slot in the cam carrier (1), which slot is shaped so that it runs concentric to the axis of rotation of the cam carrier (1), and that the threaded peg (32) that projects through the cam carrier (1) is provided on its end lying on the far side of the cam carrier (1) with a clamping lever (38) which, in the loosened position, makes it possible to rotate the cam carrier (1), and which, when it is tightened, provides the clamping required to achieve a friction-tight contact against the cam carrier (1), so that the cam carrier (1) can be clamped in position by tightening the clamping lever (38) to prevent rotations with respect to the base plate (36).

* * * * *

UNITED STATES PATENT AND TRADEMARK OFFICE

CERTIFICATE OF CORRECTION

PATENT NO. : 6,439,368 B1
DATED : August 27, 2002
INVENTOR(S) : Lutz Körtge

It is certified that error appears in the above-identified patent and that said Letters Patent is hereby corrected as shown below:

Title page, Item [54] and Column 1, line 1,
After "FOR", delete "CONTAINER" and insert -- CONTAINERS --.

Column 8,
Line 57, after "3." delete "A."

Column 10,
Line 24, after the first occurrence of "guide", delete "device,(5)" and insert -- device (5) --.

Signed and Sealed this

Twenty-eighth Day of January, 2003

JAMES E. ROGAN
*Director of the United States Patent and Trademark Office*